Patented Dec. 13, 1938

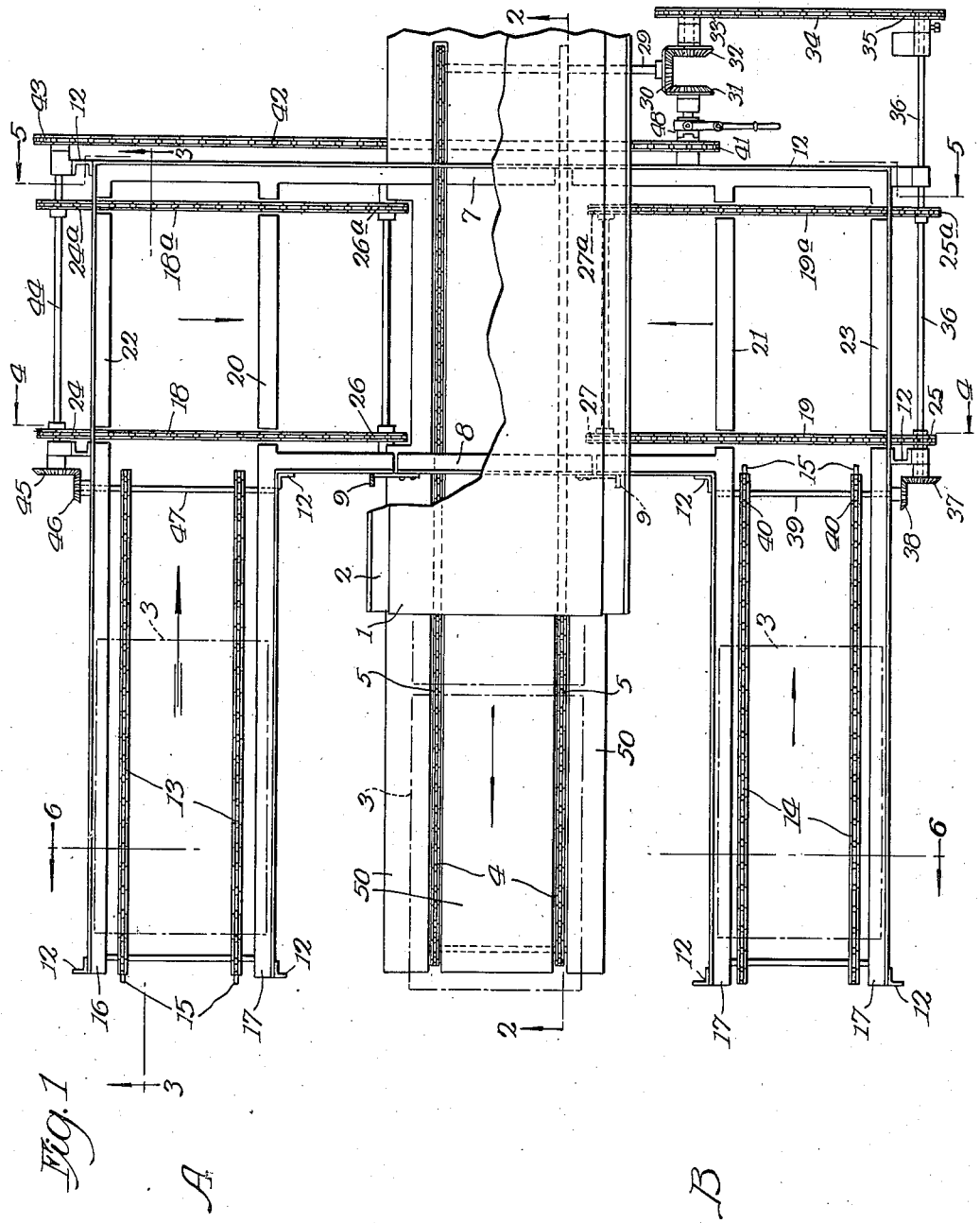

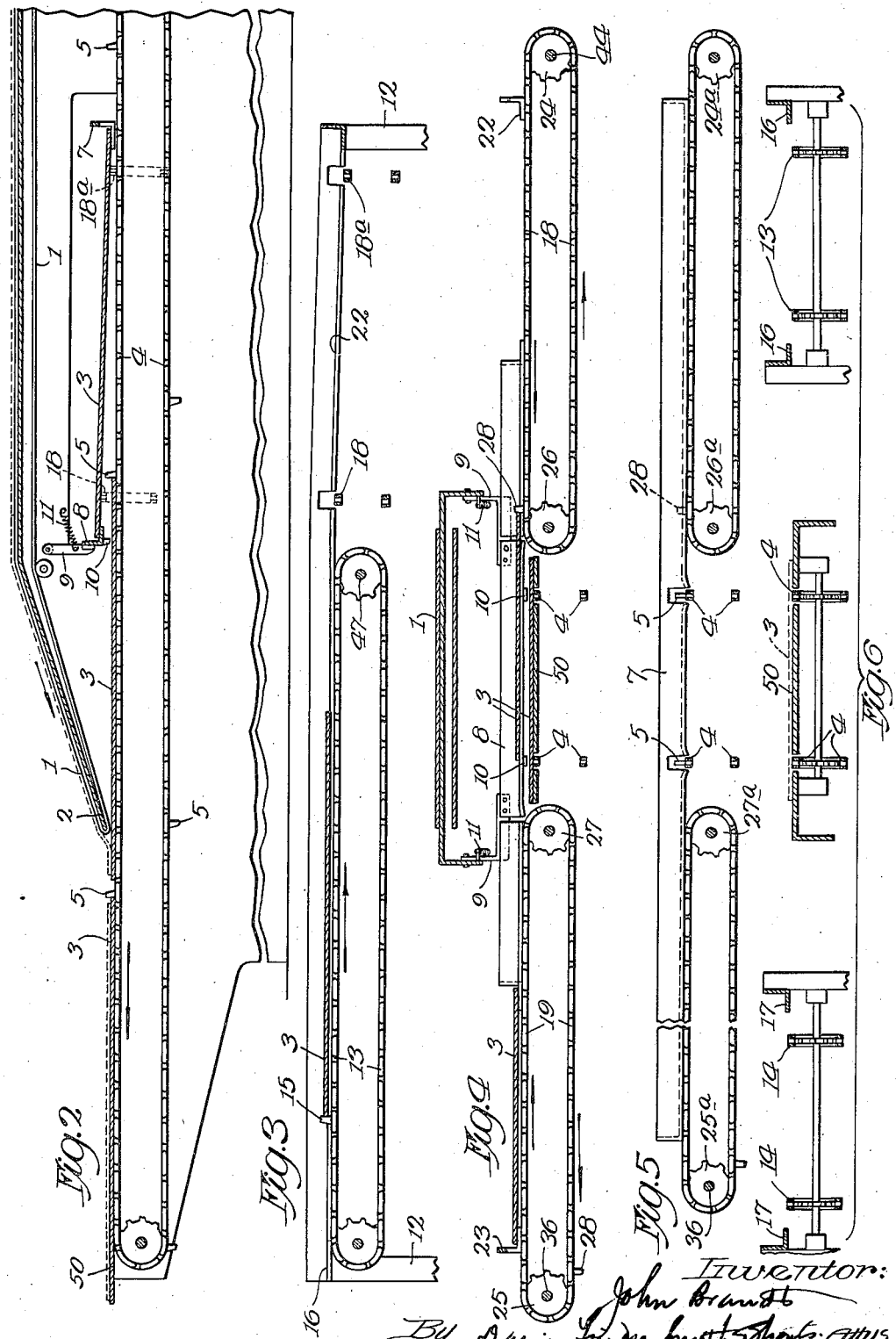

2,139,877

UNITED STATES PATENT OFFICE

2,139,877

CONVEYER FOR FEEDING TRAYS

John Brandt, Chicago, Ill., assignor to Salerno Machinery Company, Chicago, Ill., a corporation of Illinois Application July 28, 1937, Serial No. 156,131

5 Claims. (Cl. 198—79)

In commercial baking plants for the production of such products as cookies, wafers, ginger snaps, and all kinds of cakes and biscuits, on a large scale, it is common practice to employ dough-cutting machines of a well-known type which operate to cut and form the uncooked cookies or wafers of whatever kind from dough, and deliver them from a transfer belt to pans or unflanged trays, known as "peels" which are carried forwardly through the machine by endless conveyer chains.

It may here be explained that in producing "sweet goods", such as cookies, or snaps or bars variously flavored, such as ginger and lemon snaps, fig bars, etc., the formed cookies or other cakes are delivered by the transfer belt to carriers or trays in the form of flanged metal pans on the conveyer line; whereas in the case of unsweetened wafers or crackers made from sponge dough, rectangular sheets of dough, nearly but not quite cut through on intersecting lines to form a block of connected wafers, are delivered in succession to unflanged wooden trays, known as "peels", on the conveyer line.

In producing such wafers or crackers, these peels, as they pass to the front end of the machine are picked up by skilled operators, who, by a deft movement transfer the uncooked block of wafers thereon, consisting, perhaps of from one to two dozen cross rows of cakes, all connected together, to the receiving end of the long, endless oven belt which passes lengthwise through the oven in which the wafers are baked, the dough-cutting machine and oven being arranged in tandem a sufficient distance apart to permit ready handling of the peels to transfer the wafers to the oven belt.

After the wafers have been delivered to the oven belt, the empty peels are stacked on convenient stands or tables and afterwards removed by other attendants who feed them one by one to a loading chute above the upper reach of the conveyer chains at a point back of the point at which the unbaked cakes are deposited upon the pans by the transfer belt. The speed at which the dough-cutting machine operates to cut and deliver the unbaked cakes is usually such as to supply two ovens, arranged side by side, and two workmen are consequently employed between the machine and oven, one to deliver every other pan of cakes to one oven belt and the other to deliver the alternate pans of cakes to the other oven, in addition to the two attendants above mentioned, one of whom is stationed at one side of the front end of the machine, to pick up the peels placed on the stand on that particular side, and the other similarly stationed on the other side, the two attendants loading the pans alternately into the loading chute, first from one side of the machine and then from the other.

It is the object of the present invention to provide, in association with a machine of this character, conveyer mechanism upon which the empty peels may be directly placed by the operators who handle them, and which will operate to automatically return and feed the peels to the conveyer chains, thus obviating the manual handling and feeding of the peels after they are emptied. To this end I have invented and devised the conveyer mechanism hereinafter described, and my invention resides in the organization and arrangement of cooperating parts thereof, the essential elements of my invention being more particularly pointed out in the appended claims, it being understood, however, that the specific construction described is capable of modification and variation within the spirit of my invention, and that I intend my claims to be construed as broadly as consistent with prior knowledge in the art to which my novel conveyer mechanism belongs.

In the drawings, Figure 1 is a plan view of my novel conveyer mechanism, showing also parts of a dough-cutting machine with which it is designed to be used; Fig. 2 is a longitudinal vertical section of a portion of the forward end of said dough-cutting machine, showing also parts of my novel conveyer mechanism associated therewith, in a plane indicated by the dotted line 2—2 of Fig. 1; Fig. 3 is a vertical longitudinal section of my conveyer mechanism in a plane indicated by the dotted line 3—3 of Fig. 1; and Figs. 4, 5 and 6 are transverse vertical sections of the same and associated parts of the dough-cutting machine, on planes indicated, respectively, by the dotted lines 4—4, 5—5 and 6—6.

Like reference characters indicate like parts on all the figures of the drawings.

As already indicated, my present invention may be regarded as an attachment or addition to a well-known type of dough-cutting machine, and the parts of such machine with which my novel peel conveyer mechanism is associated may therefore first be briefly described before proceeding to a description of such mechanism itself.

Said prior machine includes mechanism which need not here be described for cutting and forming the uncooked wafers from dough and conveying them forwardly through the machine upon an endless loading belt 1 which near the front end of the machine passes around a stationary plate or bar 2, and acts to deliver the wafers to peels 3 which are synchronously driven forward upon a table 50 by a pair of endless conveyer chains 4—4 travelling in channels or grooves in the table, which chains are equipped with pairs of upwardly extending spaced driving lugs 5 arranged to contact the rear edges of the peels 3. As the loaded peels reach the forward delivery end of the machine they are taken up by skilled operators stationed at or near the stations marked A and B, and the sheets of wafers are transferred to the oven belts (not shown) of the two ovens, indicated generally by the reference numerals 6—6.

Under previous practice in using this machine, the empty peels were then stacked by the operators on convenient stands or tables, as already stated, and were then manually replaced by two attendants who fed the empty peels alternately one by one from opposite sides into a loading chute arranged to the rear of the point at which the wafers were delivered by the loading belt 1 to the peels. This loading chute (see Figs. 2 and 4) is inclined upwardly from rear to front, and comprises a rear stationary guide rail 7 arranged in close proximity to the upper stretch of the conveyer chains 4, and a forward swinging guide rail 8 forming part of a spring-stressed bail of which the side members 9—9 are pivoted at their upper ends to a stationary part of the fixed frame work of the machine. As the driving lugs 5 which drive forwardly a peel then being loaded reaches the member 8 of the bail, they contact a lug 10 projecting downwardly therefrom and rocks the bail against the stress of its spring 11 to release the peel then in the feed chute, and cause it to fall downwardly behind the driving lugs close to the preceding peel, in position to be driven forwardly by the next succeeding pair of lugs 5, the stationary rear guide rail 7 being notched to permit passage of such lugs. Immediately after the forward driving lugs 5 have cleared the contact lug 10 in the forward movement of a peel, the spring 11 acts to quickly restore the swinging bail into position to be again operated when contacted by the next succeeding pair of driving lugs 5. The parts thus far described are well known in the art, and do not, per se, constitute any part of my present invention.

Coming now to a description of the conveyer mechanism to which my invention particularly relates, the stationary frame work of the machine may be conveniently be constructed of structural iron members of L or U shape, all marked 12, excepting where otherwise particularly designated. In this stationary frame work are mounted two pairs of parallel return conveyer chains, marked 13—13, and 14—14, respectively, constituting opposite, similar return conveyers for the empty peels, one pair on each side of the pair of peel conveyer chains 4—4 of the dough-cutting machine above referred to. These return conveyer chains are equipped with driving lugs 15 arranged to drive empty peels placed directly by the operators who transfer the wafers from the peels onto the oven belts in guide-ways formed by the L-shaped frame members, marked 16—16, and 17—17, on opposite sides of the chains 13—13, and 14—14, respectively. By operating connections later to be described these chains are driven to carry the peels rearwardly from the operator towards and over pairs of endless transverse conveyer chains marked respectively 18—18a and 19—19a, equipped with similar driving lugs 28, the peels riding at the intersection of the conveyers upon slightly inclined plates which are aligned with the guide plates 16—16 and 17—17 above mentioned. The inner ones of these inclined plates, marked 20 and 21, respectively, are flat horizontal plates, while the outer plates, marked 22 and 23, respectively, are L-shaped in cross-section, similar to the outer guide-plates 16 and 17 and in fact may be formed integral with such plates, notched to avoid interference with the transverse conveyer chains 18—18a and 19—19a.

The pairs of transverse conveyer chains 18—18a and 19—19a are driven by pairs of sprocket wheels marked 24—24a and 25—25a, respectively, through connections to be hereafter described, and at their inner ends engage idler sprocket wheels marked 26—26a, 27—27a respectively. The axes of the four pairs of sprocket wheels are slightly inclined from the horizontal, so that the top reach of the chains 18 and 19 on the front side of the conveyer opposite the swinging guide rail 8 of the loading chute of the dough-cutting machine, is slightly higher than the top reach of the chains 18a and 19a opposite the stationary guide rail 7 of such chute, in order that the peels may be delivered into said chute alternately from opposite sides to the machine in the slightly inclined position heretofore described, as they are carried toward such chute by the lugs 28 on said chains.

The conveyer mechanism may be driven in synchronism with the movements of the conveyer chains 4—4 of the dough-cutting machine by any suitable operating connections. In the present instance (see Fig. 1), I have employed two separate trains of operating connections, for both of which the driving member consists of a driven shaft 29 of the machine, to which is fixed a bevel pinion 30 meshing with diametrically opposite bevel pinions 31 and 32, journaled in the machine frame. For one train, the hub of the pinion 32 carries a sprocket wheel 33 engaging a sprocket chain 34 which engages a sprocket wheel 35 fixed to a shaft 36, to which latter are secured the sprocket wheels 25—25a for driving the transverse conveyer chains 19—19a; and said shaft 36 also serves to drive the longitudinal return conveyer chains 14—14 through a pair of bevel pinions 37 and 38, the former secured to said shaft 36 and the latter to a shaft 39 to which are secured a pair of sprocket wheels 40—40 engaging such chains.

The bevel pinion 31 similarly serves to drive the other train of connections for driving the empty peel conveyers on the other side of the machine through sprocket wheel 41, sprocket chain 42, sprocket wheel 43, and shaft 44 to which are secured the sprocket wheels 24—24a engaging the transverse conveyer chains 18—18a and the shaft 44 also serves to drive the longitudinal return conveyer chains 13—13 through the bevel pinions 45 and 46 connected with the shaft 47.

It will be understood that the movements and timing of the opposite peel conveyer mechanisms is such that empty peels are alternately projected by the lugs 28 on the pairs of transverse conveyer chains 18—18a and 19—19a, first from one side and then from the other, into the loading chute between the stationary and swinging guide rails of the dough-cutting machine, and that this loading movement of a peel does not begin until after the swinging bail has returned to its loading position after the preceding peel has been dropped into lower position between two pairs of driving lugs 5 of the conveyer chains 4—4, and that the loading movement is completed before the swinging bail is again rocked. It will further be understood that the pairs of driving lugs 15 of the pairs of return conveyer chains 13—13 and 14—14 are so spaced and the parts so timed that empty peels are not projected into the path of the pairs of lugs 28 on the transverse conveyer chains until the last preceding peel on the particular side has cleared the intersection of the longitudinal and transverse conveyers, so that the succeeding peel may enter freely above the top reach of the transverse conveyer on the inclined plates, and rails 20—22, or 21—23, as the case may be.

While the operations above described are those which occur when production of crackers or wafers is under way, and the wooden trays known as peels are employed, yet my conveyer mechanism is also useful when sweet goods, baked in flanged metal trays or pans are being used. In the latter case, after the pans carrying the baked product emerge from the ovens, they are conducted in a long path over cooling conveyers to the packing tables, and the empty pans are then, under usual and ordinary practice, all returned by a single line of conveyer mechanism to delivery station on one side of the dough-cutting machine adjacent the loading chute of the machine, into which the pans are loaded by a single attendant. While the process of cutting and baking sweet goods is materially slower than that of producing wafers or crackers from sponge dough, and a single attendant is therefore able to load all the pans returned from both ovens, yet it is absolutely necessary in the regular operation of the machine that the pans must be successively inserted without interruption into the narrow loading chute sidewise of the machine.

This handling of the pans requires close attention and considerable accuracy, and occasionally jamming of the parts results from inattention or irregularity of operation. I have therefore made provision in my new conveyer mechanism for supplying empty pans to the conveyer chains of the dough-cutting machine from one side of the loading chute only, and to this end have made provision for doubling the speed of the conveyer mechanism on the side of the machine to which the empty pans are being returned, which in the present instance includes an interchangeable sprocket wheel formed with one-half the number of teeth of the sprocket wheel 35 and which may be substituted therefor, thus doubling the speed of the conveyer mechanism driven thereby.

It will be understood that the delivery station to which the empty pans are returned is located conveniently near the outer loop of the conveyer chains 19—19a, though if desired it may be located adjacent the path of the chains 14—14, the manipulation of the pans by the attendant in placing the pans upon the conveyer in either case being greatly simplified, and the attention required being greatly lessened, as compared with previous practice, whereby greater certainty and efficiency of operation is attained.

It is obvious that in so using the machine the conveyer mechanism on the opposite side of the machine performs no function, and I have therefore provided a manually operable clutch, marked 40, for disconnecting at will the bevel pinion 33 from the sprocket wheel 41 and the conveyer mechanism driven by it.

I claim:

1. In combination with a machine arranged to deliver successively at its forward end filled trays of wafers and having a transverse loading chute arranged to receive empty trays rearwardly of its forward delivery end, conveyer mechanism comprising a pair of conveyers arranged parallel with said forward delivery end of the machine, and a pair of transverse conveyers arranged to receive empty trays delivered to them by said first-mentioned conveyers and deliver them alternately into said loading chute.

2. In combination with a machine arranged to deliver successively at its forward end filled trays of wafers and having a transverse loading chute arranged to receive empty trays rearwardly of its forward delivery end, conveyer mechanism comprising a pair of conveyers arranged parallel with said forward delivery end of the machine, a pair of transverse conveyers arranged to receive empty trays delivered to them by said first-mentioned conveyers, and separate trains of operating connections arranged to drive said two transverse conveyers, said operating connections being timed to deliver empty trays alternately from opposite sides into said loading chute.

3. In combination with a machine arranged to deliver successively at its forward end filled trays of cakes and having a transverse loading chute arranged to receive empty trays rearwardly of its forward delivery end, similar opposite conveyer mechanisms comprising a pair of return conveyers arranged parallel with the forward end of the machine, a pair of transverse conveyers arranged to receive empty trays delivered to them by said first-mentioned conveyer, separate trains of operating connections arranged to drive said two transverse conveyers, said operating connections being timed to deliver empty trays alternately from opposite sides into said loading chute, means for doubling the speed of one of said trains of operating connections, whereby said train may be set to deliver empty pans successively from one side only into said loading chute, and means for disabling the other of said trains.

4. In combination with a machine having a filled tray conveyer arranged to deliver at its forward end filled trays of cakes and having a transverse loading chute arranged to receive empty trays rearwardly of its forward delivery end, said loading chute being slightly inclined from front to rear with respect to the plane of said conveyer, conveyer mechanism including an empty tray conveyer adjacent and parallel with said filled tray conveyer, and a transversely inclined transverse conveyer arranged to receive empty trays delivered to it by said empty tray return conveyer and deliver them into said inclined loading chute.

5. In combination with a machine having a filled tray conveyer arranged to deliver at its forward end filled trays of cakes and having a transverse loading chute arranged to receive empty trays rearwardly of its forward delivery end, said chute being formed with an intermittently movable guide rail arranged to intermittently drop successive trays in said chute onto said conveyer, conveyer mechanism including a transverse conveyer arranged to receive empty pans and successively deliver them into said loading chute during intervals of rest between the intermittent movement of said movable guide rail.

JOHN BRANDT.